United States Patent
Patel (10) Patent No.: US 9,654,391 B2
(45) Date of Patent: May 16, 2017

(54) VIDEO ROUTER

(71) Applicant: Evertz Microsystems Ltd., Burlington (CA)

(72) Inventor: Rakesh Patel, Mississauga (CA)

(73) Assignee: Evertz Microsystems Ltd., Burlington (CA)

(*) Notice: Subject to any disclaimer, the term of this patent is extended or adjusted under 35 U.S.C. 154(b) by 44 days.

(21) Appl. No.: 14/505,124

(22) Filed: Oct. 2, 2014

(65) Prior Publication Data

US 2015/0092771 A1    Apr. 2, 2015

Related U.S. Application Data

(60) Provisional application No. 61/885,588, filed on Oct. 2, 2013.

(51) Int. Cl.
*H04L 12/713* (2013.01)
*H04L 12/931* (2013.01)
*H04L 12/933* (2013.01)
*H04L 12/773* (2013.01)

(52) U.S. Cl.
CPC ............ *H04L 45/60* (2013.01); *H04L 49/101* (2013.01); *H04L 49/206* (2013.01)

(58) Field of Classification Search
CPC ........... H04L 29/06027; H04L 65/4084; H04L 45/60; H04L 49/206; H04L 49/101; H04N 21/2318; H04N 21/2326; H04N 21/23406; H04N 21/2347; H04N 21/2362; H04N 21/2365; H04N 21/26606; H04N 21/4347; H04N 21/47202; H04N 21/6405; H04N 21/6587; H04N 19/40; H04N 21/2343; H04N 21/234309
See application file for complete search history.

(56) References Cited

U.S. PATENT DOCUMENTS

| | | | |
|---|---|---|---|
| 6,976,134 B1 * | 12/2005 | Lolayekar et al. | 711/148 |
| 7,194,550 B1 * | 3/2007 | Chamdani | H04L 69/08 709/227 |
| 8,776,161 B2 * | 7/2014 | Gazier | H04N 21/222 375/240.07 |
| 8,891,406 B1 * | 11/2014 | Shekhar | 370/255 |

* cited by examiner

*Primary Examiner* — Ayaz Sheikh
*Assistant Examiner* — Debebe Asefa
(74) *Attorney, Agent, or Firm* — Bereskin & Parr LLP/S.E.N.C.R.L., s.r.l.

(57) ABSTRACT

The embodiments described herein provide a video router with integrated control layers and a method of operating the same. The video router includes line cards and fabric cards coupled to a controller communication network. The line cards and fabric cards include crosspoint switches and card controllers. Each card controller controls the operation of the corresponding crosspoint switches. Each crosspoint switch includes a plurality of input switch terminals and output switch terminals coupled to a backplane, providing signal communication paths between the line and fabric cards. The configuration of at least some of the crosspoint switches may be controlled by the controller on the same card or on other cards. The video router may include a switch configuration table to track the coupling of input and output terminals through each of the cross-point switches.

20 Claims, 7 Drawing Sheets

VIDEO ROUTER

FIELD

The described embodiments relate to routers for video signals and other data streams.

BACKGROUND

The number of devices coupled to data communications networks is increasing rapidly. The routing of data streams from and to such devices is increasingly more complex and difficulty in allocating efficient routes, or even any route at all, in various components in a communication network can affect the quality of service delivery to a user of a device. For example, communication networks typically contain routers that couple an input data stream received at an input port to an output port at which the data stream is available to a downstream device. As the size of routers increases (i.e. as the number of input and output ports on a router increases, then complexity of creating efficient routing within the router and between network devices increase non-linearly.

It is desirable to provide an efficient system and methods that allows a network device to efficiently configure routes for data streams.

SUMMARY

Various embodiments relate to video routers having integrated control layers.

The video routers include line cards and fabric cards coupled to a controller communication network. The line cards may include input ports or output ports or both for receiving and providing external video signals and other signals. The line cards and fabric cards include crosspoint switches and card controllers. Each card controller controls the operation of the corresponding crosspoint switches. Each crosspoint switch includes a plurality of input switch terminals and output switch terminals coupled to a backplane, providing signal communication paths between the line and fabric cards. The configuration of at least some of the crosspoint switches may be controlled by the controller on the same card and on other cards. The video router may include a switch configuration table to track the coupling of input and output terminals through each of the cross-point switches. Each of the controllers can access the configuration table. The configuration table may be recorded in a central location or may be distributed across multiple locations or both. Some of the configuration table locations may be in some of the controllers or in other data storage elements.

The backplane includes a plurality of static point-to-point backplane connections that couple output switch terminals on one card to input switch terminals on another card. In various embodiments, the backplane may include as many or as few backplane connections between output switch terminals and input switch terminals.

The controllers configure the crosspoint switches, including crosspoint switches on other cards, to provide connections between between input switch terminals and output switch terminals and to provide connections for data streams between input ports and output ports. Each such path or connection may be routed through one or more line cards, fabric cards and one or more backplane connections or any combination of such elements by appropriate configuration of the cross-point switches.

In some embodiments, various data streams may be assigned various priority levels. In some cases, paths required to couple different data streams may conflict such that it may not be possible to maintain all such paths simultaneously. The controllers may be configured to maintain some of the paths in preference to other paths based on the relative priorities of the data streams.

In some embodiments, a controller may establish multiple paths for particular data streams to provide redundancy.

In some embodiments, a controller may not be able to organize a path for a particular data stream. The controller may be able to send a routing request to a supervisor, which may be an external device to the router. The supervisor may monitor and control the configuration of the crosspoint switches in the router and optionally in other routers. In some embodiments, multiple or duplicate supervisors may be provided.

In response to a routing request, a supervisor may modify the configuration of one or more crosspoint switches on one or more cards to provide a desired route. In other embodiments, the supervisor may change provide a response to a controller which may then configure a route based on the response. Subsequently, a controller may use a response to a prior request or a route created by a supervisor in response to a prior request to provide the same route without sending a routing request to a supervisor.

These and other aspects of the invention are further described in the description of example, embodiments set out below.

BRIEF DESCRIPTION OF THE DRAWINGS

For a better understanding of the applicant's teachings described herein, reference will now be made, by way of example only, to the accompanying drawings which show at least one exemplary embodiment, and in which.

For simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF EXEMPLARY EMBODIMENTS

Figure 1:
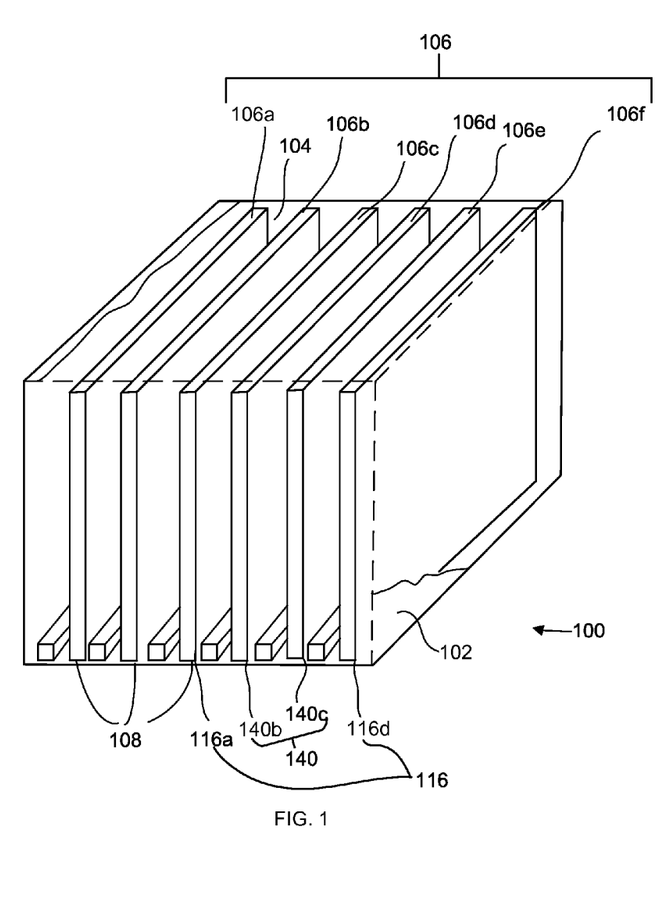
FIG. 1 is a cross-section of a video router according to an example embodiment.
Figure 2:
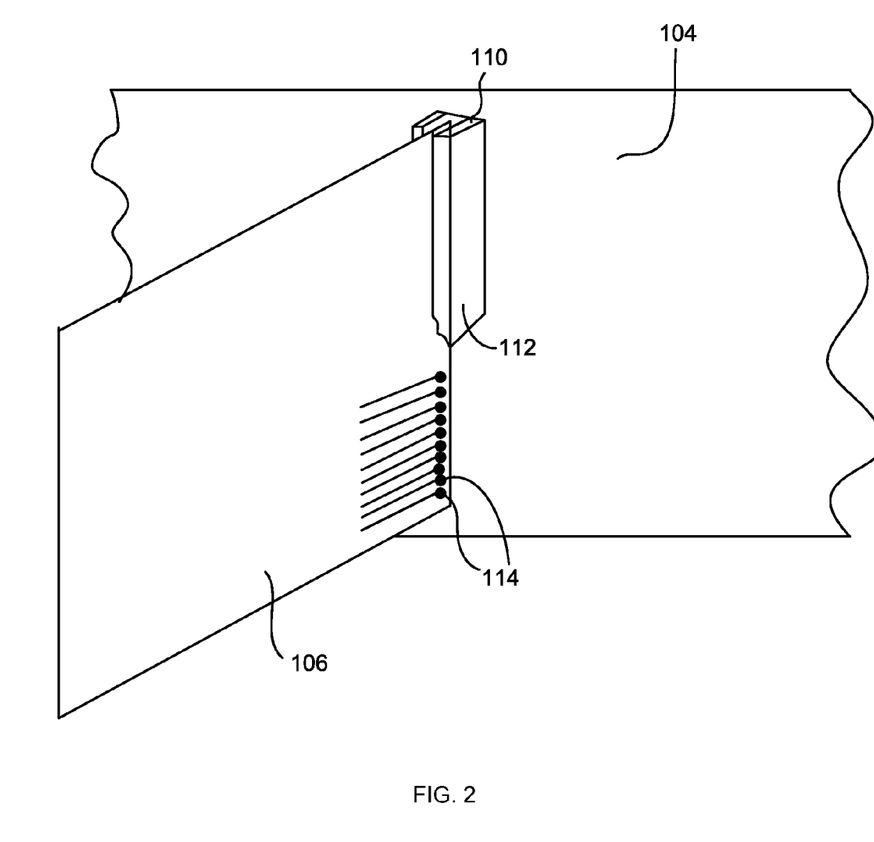
FIG. 2 is a cross-section of a video router according to another example embodiment.

Reference is first made to FIGS. 1 and 2, which illustrates a first video router 100 with an integrated control layer. Router 100 includes a frame or housing 102, a backplane 104 and a plurality of cards 106, such as a first card 106a, a second card 106b, a third card 106c, a fourth card 106d, a fifth card 106e and a sixth card 106f. The frame 102 includes a plurality of frame slots 108 in which cards may be received and held in place. The backplane 104 includes backplane connector 110 corresponding to each slot 108 and each card 106. Each backplane connector includes a plurality of backplane pins or contacts 112. Each card 106 includes a plurality of card pins or contacts 114, each of which corresponds to a backplane pin 112 of the corresponding backplane connector. When a card 106 is installed in frame 102, the card pins 114 couple with corresponding backplane pins 112 making an electrical connection through which a data signal may be transmitted.

Cards 106 may include various types of cards. For example, some of the cards may be line cards 116, such as a first line card 116a and a second line card 116d, which include input ports or output ports for respectively receiving and transmitting data signals, or both input and output ports. Other cards 106 may be fabric cards 140, such as a first fabric card 140b and a second fabric card 140c, which facilitate switching of signals between various input and port ports.

Figure 3:
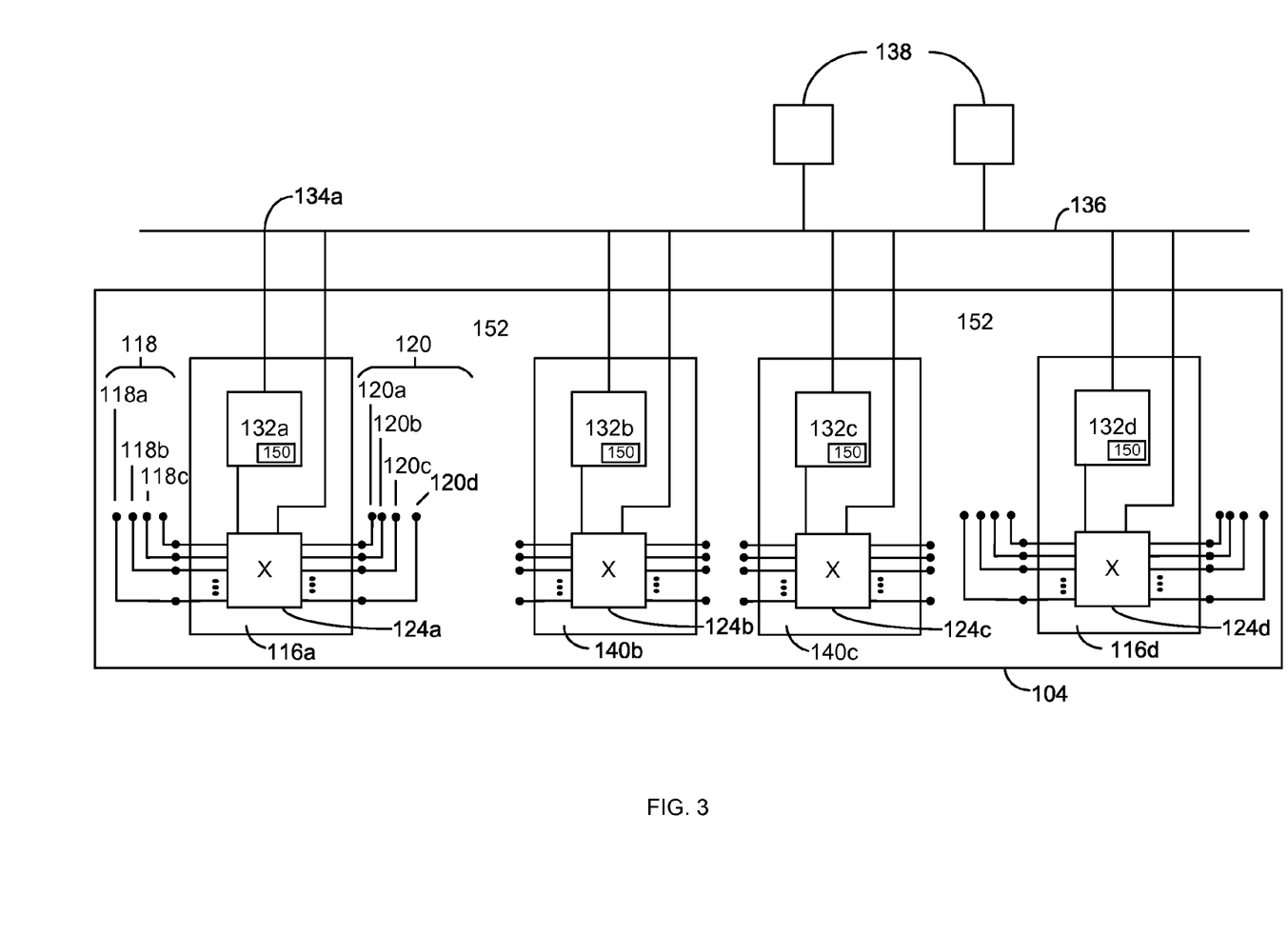
FIG. 3 is a block diagram of a video router according to an example embodiment.
Figure 4:
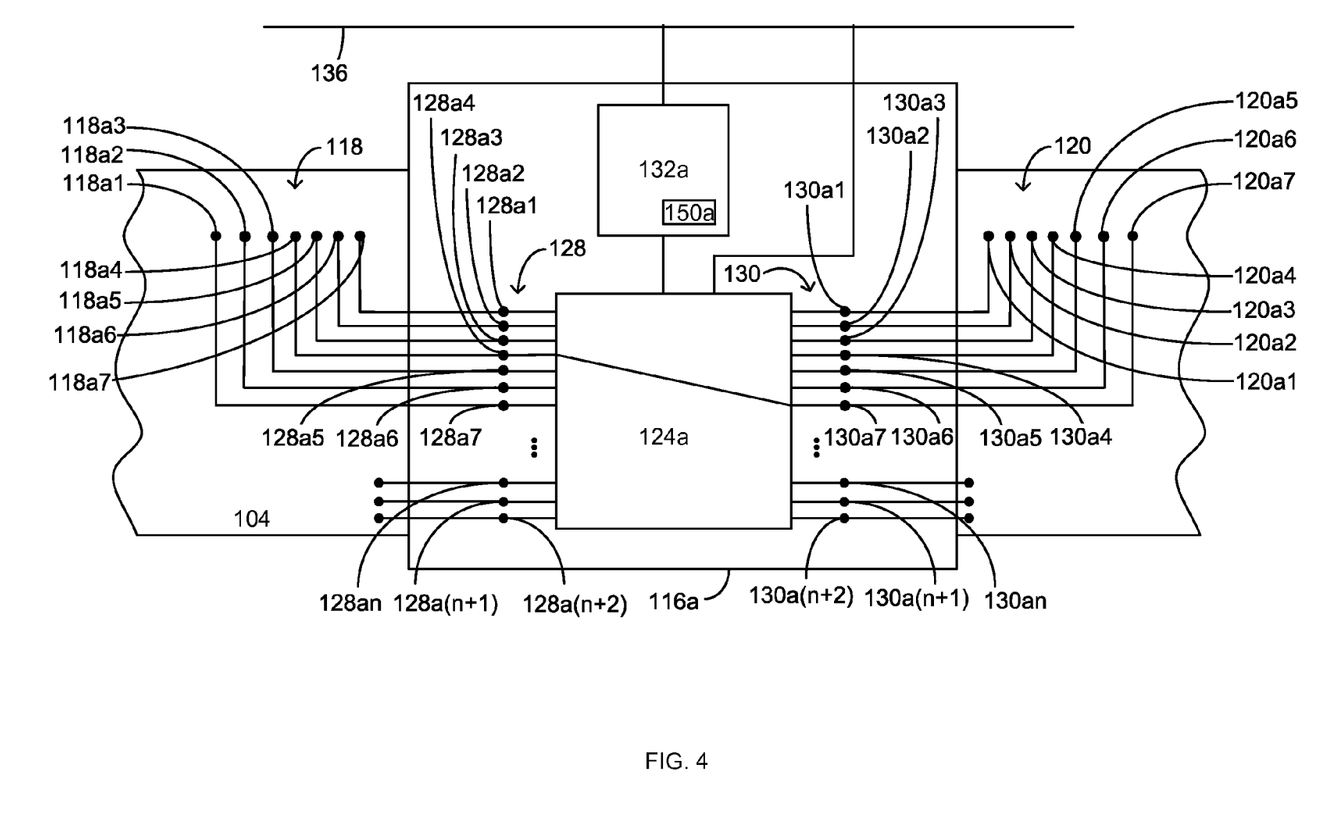
FIG. 4 is a block diagram of a video router according to another example embodiment.
Figure 5:
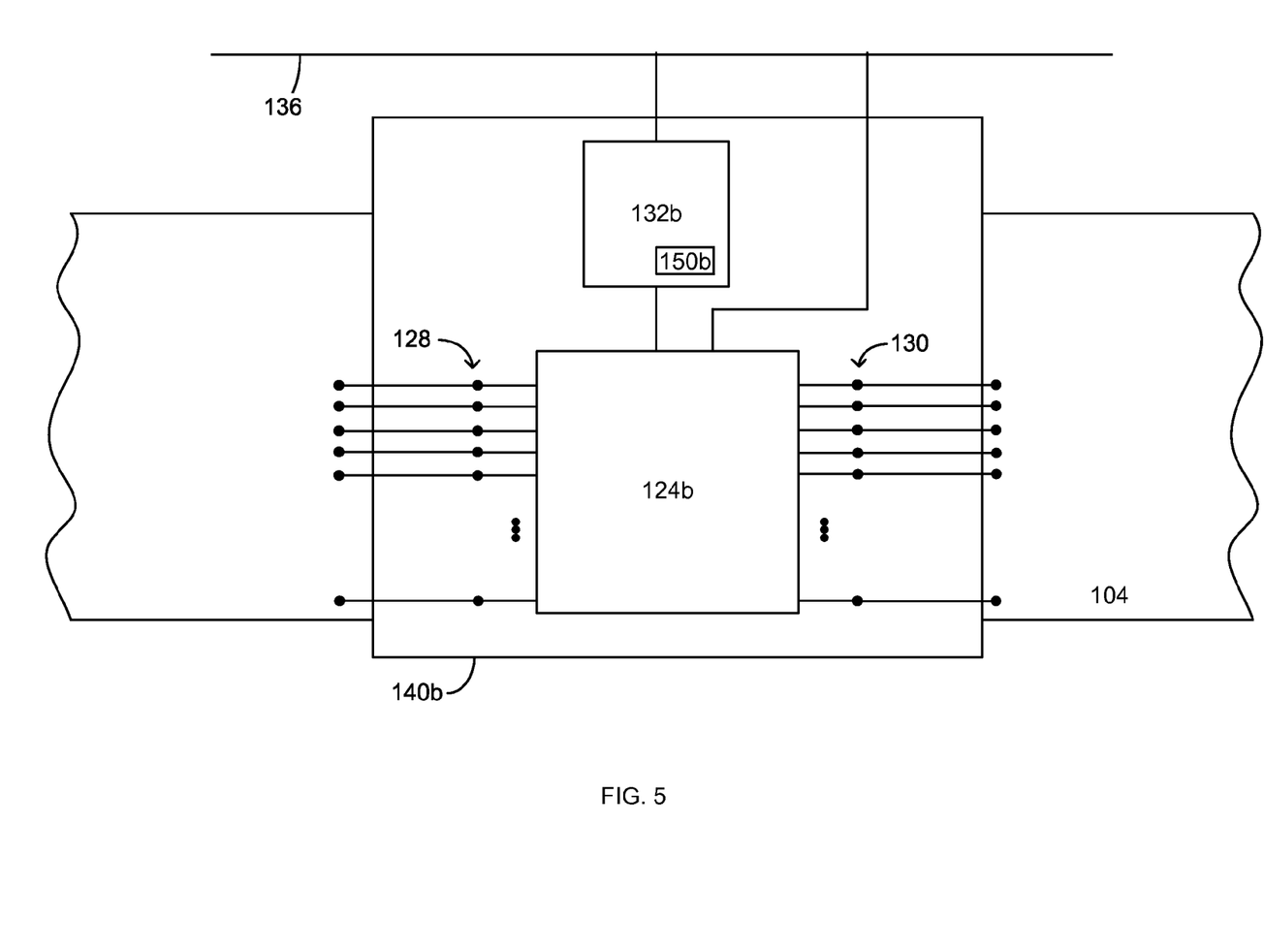
FIG. 5 is a block diagram of a video router according to another example embodiment.

Reference is made to FIGS. 3, 4 and 5, which schematically illustrate components of router 100. In the present example embodiment, each input port 118 or output port 120 on a line card 116a is coupled to an external signal through the backplane 104. In the illustrated embodiment of FIG. 3, input port 118 comprises a first input port 118a, a second input port 118b and a third input port 118c, and output port 120 comprises a first output port 120a, a second output port 120b, a third output port 120c and a fourth output port 120d. The backplane may, for example, include a pass-through connector to which a line card port 118, 120 may be coupled within frame 102 and to which a cable (not shown) may be coupled on the rear of the backplane. The line card port 118, 120 is electrically coupled to the cable (not shown), allowing the line card to receive or transmit a data signal on the cable. In other embodiments, line card ports may be directly coupled to a cable or may be coupled to a cable through the backplane using a coupling other than a pass-through connector.

Line card 116a includes a line card crosspoint switch 124a with a plurality of switch terminals. In this example, crosspoint switch 124a has a plurality of input switch terminals 128 and a plurality of output switch terminals 130. Each input port 118 is coupled to at least one input switch terminal 128 and each output port 120 is coupled to at least one output switch terminal 130. In addition, a plurality of input switch terminals 128 are coupled to the backplane 104 through the corresponding backplane connector 110. A plurality of output switch terminals 130 are coupled to the backplane 104 through the corresponding backplane connector 110.

Line card 116a also includes a line card controller 132a that is coupled to crosspoint switch 124a and which provides control signals to couple or decouple particular input switch terminals 128 to particular output switch terminals 130. Card controller 132a is coupled to a controller communication network 136 at a control system terminal 134a through which the card controller 132a may communicate with other cards 106 and with external control devices such as an external supervisor 138. In some embodiments, a line card controller 132a may be coupled to controller communication network 136 through the backplane or through another communication bus in frame 102 to which the line card is couple when installed in the frame.

Each fabric card, such as fabric card 140b includes a card controller 132b and a crosspoint switch 124b, which are coupled together and operate in a manner similar to the card controller 132a and crosspoint switch 124a of line card 116a. Crosspoint switch 124b includes a plurality of input switch terminals 128 and output switch terminals 130 that are coupled to the backplane 104. The crosspoint switch 124b may be configured to couple any of the input switch terminals 128 to any of the output switch terminals 130 under the control of card controller 132b. As illustrated in FIG. 3, router 100 further includes a fabric card 140c, which includes a card controller 132c and a crosspoint switch 124c, and a line card 116d, which includes a card controller 132d and a crosspoint switch 124d.

Each crosspoint switch 124a, 124b, 124c, 124d in router 100 is coupled to the controller communication network 136 through which the configuration of the crosspoint switch 124a, 124b, 124c, 124d may be changed by card controller 132a, 132b, 132c, 132d on other cards 106.

Router 100 also includes a switch configuration table or database 150. Database 150 records the current setting for every input switch terminal and output switch terminal in all cross-point switches 124a, 124b, 124c, 124d in the router 100. For example, part of the contents of database 150 may be:

| Switch | Terminal | Setting |
|--------|----------|---------|
| 124a | 128a1 | Coupled to 130c3 |
| 124a | 128a2 | Coupled to 130a27 |
| 124a | 128a3 | Open |
| 124a | 128a4 | Coupled to 130a8 |
| ... | ... | ... |
| 124a | 130a3 | Coupled to 128a1 |
| 124a | 130a4 | Open |
| 124a | 130a5 | Coupled to 128a2 |
| 124a | 130a6 | Open |
| 124a | 130a7 | Coupled to 128a2 |
| 124b | 130a8 | Coupled to 128a4 |
| ... | ... | ... |
| 124b | 128b1 | Open |
| ... | ... | ... |
| 124c | 128c35 | Coupled to 130c14 |
| ... | ... | ... |
| 124c | 130c14 | Coupled to 128c35 |
| ... | ... | ... |
| 124d | 128d12 | Coupled to 130d5 |
| 124d | 130d5 | Coupled to 128d12 |
| ... | ... | ... | where router 100 of FIG. 4 comprises a first input port 118a1, a second input port 118a2, a third input port 118a3, a fourth input port 118a4, a fifth input port 118a5, a sixth input port 118a6, a seventh input port 118a7, a first output port 120a1, a second output port 120a2, a third output port 120a3, a fourth output port 120a4, a fifth output port 120a5, a sixth output port 120a6, a seventh output port 120a7, a first input switch terminal 128a1, a second input switch terminal 128a2, a third input switch terminal 128a3, a fourth input switch terminal 128a4, a fifth input switch terminal 128a5, a sixth input switch terminal 128a6, a seventh input switch terminal 128a7, an nth input switch terminal 128an, a (n+1)th input switch terminal 128a(n+1), a (n+2)th input switch terminal 128a(n+2), a first output switch terminal 130a1, a second output switch terminal 130a2, a third output switch terminal 130a3, a fourth output switch terminal 130a4, a fifth output switch terminal 130a5, a sixth output switch terminal 130a6, a seventh output switch terminal 130a7, an nth output switch terminal 130an, a (n+1)th output switch terminal 130a(n+1) and a (n+2)th output switch terminal 130a(n+2).

Database 150 is accessible to each of the controllers 132a, 132b, 132c, 132d. In some embodiments, the database 150 may be recorded in a central location, for example, in one of the controllers 132a, 132b, 132c, 132d where the local controller 132a, 132b, 132c, 132d may access the database directly and each of the other controllers may access the database through the controller communication network 136.

In other embodiments, the database may be a distributed database with components that are located in multiple locations within router 100. For example, components of database 150a, 150b may be located in each of the controllers 132a, 132b, as is illustrated in FIGS. 4 and 5. Each controller 132a, 132b may contain the status of the cross-point switch 124a, 124b in the same card 106. Controllers 132a, 132b, 132c, 132d on other cards 106 may access the status of non-local cross-points switches through the controller communication network 136.

In other embodiments, the database may be recorded in a data storage device or system that is external to router 100, but which is accessible to the controller 132a, 132b, 132c, 132d.

In still other embodiments, a copy of the entire database 150 may be maintained at each controller 132a, 132b, 132c, 132d. A synchronization system that locks some or all of each copy of the database may be used to ensure that all copies of the database 150 are maintained in synchronization. In such embodiments, each controller 132a, 132b, 132c, 132d may use only its local copy of the entire database 150.

In various embodiments, a combination of these techniques may be used to maintain database 150.

As illustrated in FIG. 5, the backplane 104 includes a plurality of static point-to-point backplane connections 152 that couple output switch terminals on one card 106 to input switch terminals on another card 106. For example, backplane connections may couple output switch terminal 130a27 on line card 116a to input switch terminal 128c35 on fabric card 140c. Various embodiments may include as many or as few backplane connections between output switch terminals to input switch terminals.

In any particular embodiment, the sizes of the various crosspoint switches 124a, 124b, 124c, 124d and the number of backplane connections can be selected to provide a desired level of functionality in the router. For example, in a router designed for a specific purpose in which only a limited number of couplings between input ports 118 and output ports 120 may be required may have a correspondingly limited number of backplane connections 152. Fabric cards are typically useful to increase the flexibility with which a particular input port can be coupled to a particular output port. In some embodiments, all cards 106 may be line cards with no fabric cards.

By selectively configuring one or more crosspoint switches 124a, 124b, 124c, 124d, a particular input port 118 on one line card 116 may be coupled to a particular output port 120 on the same or another line card.

Figure 6:
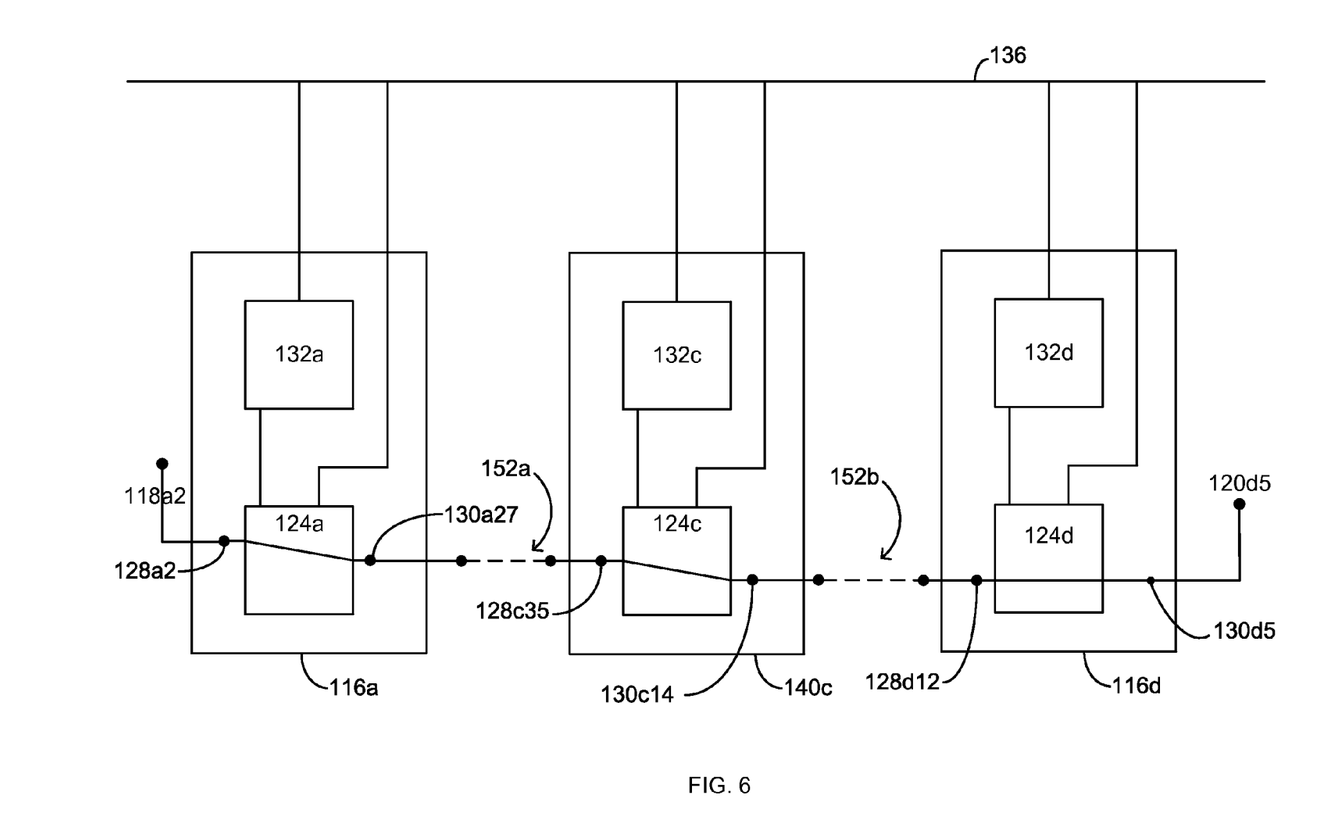
FIG. 6 is a block diagram of a video router according to another example embodiment.

Reference is made to FIG. 4. For example, if:
input port 118a4 is fixedly coupled to input switch terminal 128a4;
switch crosspoint switch 124a couples input switch terminal 128a4 to output switch terminal 130a7; and
output switch terminal 130a7 is fixedly coupled to output port 120a7, then an input data signal received input port 118a4 on line card 116a will be coupled to output port 120a7.
Reference is made to FIG. 6. If:
input port 118a2 is fixedly coupled to switch input terminal 128a2;
switch input terminal 128a2 is coupled to output switch terminal 130a27 in crosspoint switch 124a;
output switch terminal 130a27 is coupled to input switch terminal 128c35 in fabric card 140c through backplane connection 152a;
switch input terminal 128c35 is coupled to output switch terminal 130c14 in crosspoint switch 124c;
output switch terminal 130c14 is coupled to input switch terminal 128d12 through the backplane connection 152b;
switch input terminal 128d12 is coupled to output switch terminal 130d5 in crosspoint switch 124d; and
output switch terminal 130d5 is fixedly coupled to output port 120d5, then an input data signal received at input port 118a2 on line card 116a will be coupled to output port 120d5 on line card 116d.

In router 100, each controller 132a, 132b, 132c, 132d is coupled to each crosspoint switch 124a, 124b, 124c, 124d in the router and may instruct any crosspoint switch 124a, 124b, 124c, 124d to couple specific input switch terminals and output switch terminals within the crosspoint switch 124a, 124b, 124c, 124d. Through one or more steps through crosspoint switches and through backplane connection 152, an input signal received at an input port 118 may be coupled to an output port 120 on the same or a different line card. In some embodiments, the crosspoint switches and the number of pairs of output switch terminals and input switch terminals coupled by backplane connections 152 may be sufficient to allow any input port 118 to be coupled to any output port 120, possibly through a variety of different routes.

A particular controller 132a, 132d in a line card 116a, 116d may be configured to ensure that a data signal or data stream received at the line card is routed through to an appropriate destination for the data stream. For example, when a data stream is initially received at an input port 118, the controller examines the packets in the data stream, which will identify a destination for the data stream. The controller then determines which output port 120 in the router (which may be on the same line card as the controller or on another line card) is coupled to the destination. The controller then determines a path through the router and configures one or more crosspoint switches to provide the path between the input port 118 and the output port 120. The controller will typically select a route based on router configuration data that is previously recorded in the controller. The router configuration data includes information about the availability of backplane connections between different cards and may include additional information about the router structure or configuration. The controller will also typically consider the contents of the database 150. Typically a controller will not change the configuration of an input switch terminal or an output switch terminal that is already in use (i.e. coupled to a corresponding switch terminal). In some embodiments, a priority level for some or all of the couplings between different pairs of input switch terminal and output switch terminal may be maintained in database 150. A controller may determine a priority level for a data stream that the controller is routing through router 100. If an input switch or an output switch terminal is in use, but the stored priority level for the stream being routed through the switch is lower than the priority of the stream that the controller is attempting to route, then the control may change the configuration of the switch to use it for the higher priority data stream. In some cases, the router may have multiple paths through which a data stream can be routed from a particular input port 118 to a particular output port 120 and it may be possible to provide a needed routing for a high priority data stream without disrupting a lower priority data stream. Each controller may be configured to identify multiple routings to reduce disruption to existing routes set up within the router.

In some conditions, a controller may not be able to determine a route by which a data stream can be delivered to a particular output port 120. In such conditions, the controller 132 may send a routing request to a supervisor 138 through the controller communication network 136. A supervisor will typically be an external device that can monitor and control the configuration of crosspoint switches 124a, 124b, 124c, 124d in the router 100 and possibly in other routers. In some embodiments, a supervisor 138 may be built into a router. In some embodiments, duplicate or multiple supervisors may be provided to provide redundancy or improved responsiveness when a request is sent to a supervisor or a group of supervisors.

Each time a controller 132a, 132b, 132c, 132d changes the configuration of a switch 124a, 124b, 124c, 124d, the changes are recorded in the database 150.

A supervisor may receive various types of requests. For example, a controller may ask a supervisor to provide a route from a particular input port to a particular output port. A controller may ask a supervisor to examine a packet to determine the output port to which the packet (and the corresponding data stream) should be coupled, and possibly also to provide a routing between the input port on which the data stream is received and the output port.

In some embodiments, a supervisor may directly change the configuration of crosspoint switches 124a, 124b, 124c, 124d and update database 150 and advise the requesting controller that the request has been satisfied and optionally provide details of configuration changes made in the router. In other embodiments, a supervisor may provide a response to a controller making a request and the controller may then implement the details of the response.

In some embodiments, each controller 132a, 132b, 132c, 132d may record some or all of the routes that are used by the controller, including some or all of the requests provided by a supervisor. The controller 132a, 132b, 132c, 132d may subsequently refer to the recorded requests to select routes for data streams between input ports 118 and output ports 120 based on the previously recorded routes. In some embodiments, the controller may track performance information such as the frequency with which transmission failures occur in particular routes and may select more reliable routes. Over time, the recorded route may become a library allowing a controller 132a, 132b, 132c, 132d to resolve an increasing number of routing requirement without sending a request to a supervisor. In addition, some or all of the controllers may be configured to find routes without reference to previously recorded route or making a request to a supervisor.

In this manner, the controllers 132a, 132b, 132c, 132d in each card 106 are able to provide routes for data streams through the router 100. Some of the routes may traverse only the line card on which a data stream is received while other routes may traverse various line cards, fabric cards and backplane connections. In doing so, the controller can reduce the number of requests transmitted to the supervisor, increasing the rate at which data streams can be coupled through a router, particularly when a router receives, routes and transmits a large number of data streams.

Router 100 has been described as a video router. A video router will typically receive audio/video data streams (which may be referred to as transport streams). In some embodiments, the data streams may also include non-video streams or may not include any video streams at all.

Figure 7:
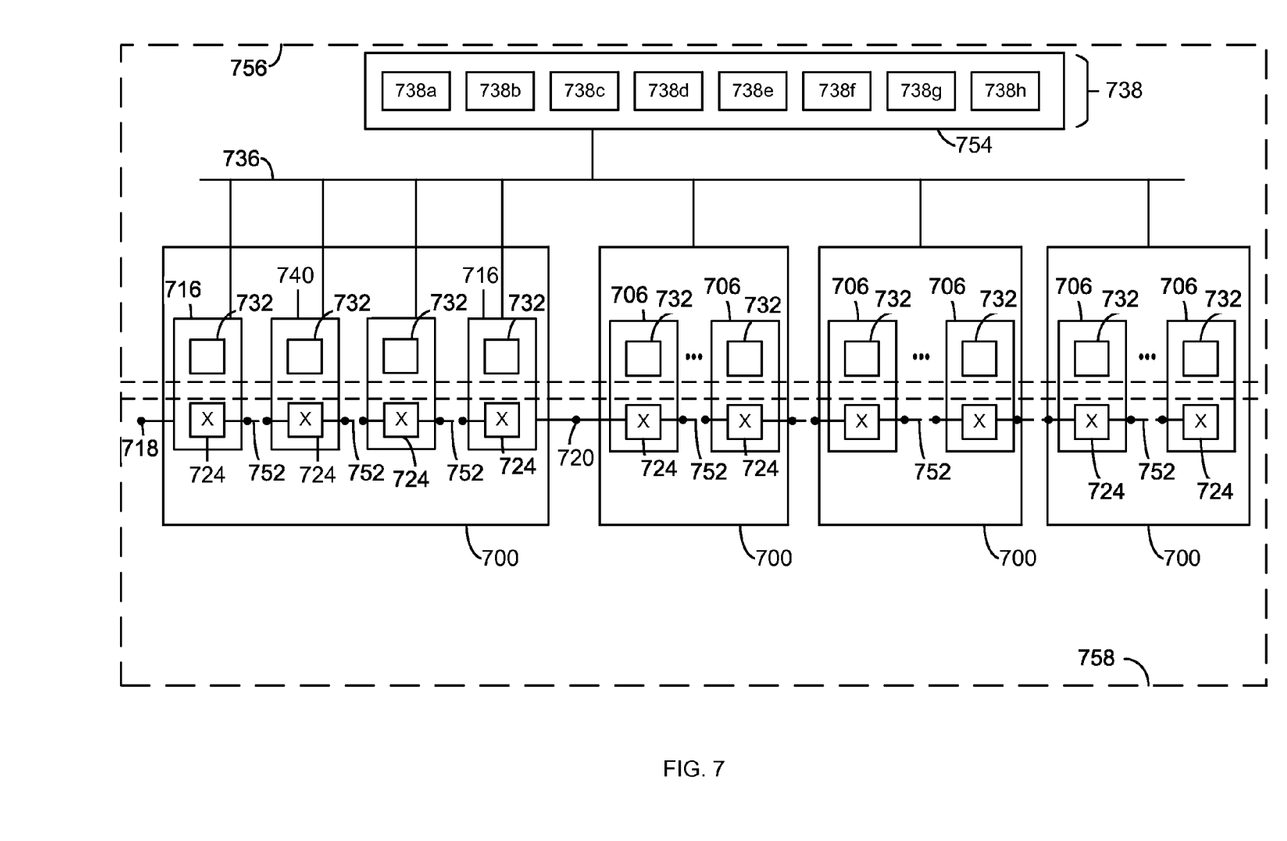
FIG. 7 is a block diagram of a control hierarchy of a video router according to an example embodiment.

Reference is next made to FIG. 7, which illustrates a control hierarchy between the card controllers, supervisors, other routers and other devices in a system. In some situations, a plurality of routers 700 may be coupled to provide a data transmission system. For example, routers 700 may be installed in a video processing facility such as a television studio or broadcast facility. Some or all of the routers may receive and transmit a plurality of input and output data streams. In some facilities, hundreds, thousands or even millions of data streams may be received and transmitted. The group of routers will typically be interconnected with a variety of other equipment including signal processors, analytic devices and other devices that generate or require data streams that are switched through one or more routers.

Each router 700 is coupled to a supervisor system 754, which may include a plurality of supervisors 738, such as a first supervisor sub-system 738a, a second supervisor sub-system 738b, a third supervisor sub-system 738c, a fourth supervisor sub-system 738d, a fifth supervisor sub-system 738e, a sixth supervisor sub-system 738f, a seventh supervisor sub-system 738g and an eighth supervisor sub-system 738h. The supervisor system 754 forms a hierarchy in conjunction with the controllers 732 in each router. As described above, a card controller 732 on a card 706, including a line card 716 and a fabric card 740, in a router 700 may control the configuration of the corresponding switch 724 on its card 706 and may also be authorized to control the configuration of switches 724 on other cards within the same router. The controller may send requests to a corresponding supervisor sub-system 738a when the controller is unable to determine a route for a data stream, for example, when the controller is unable to allocate switches or connections to set up a required route, or when a route may require coordination between routers or under other conditions, which may include instructions from a supervisor to always make a request to the supervisor when certain types of data streams are received or after a particular time or other conditions. In some cases, two or more supervisors may be assigned to each router and may act as primary and backup routers, may operate in parallel, or may operate in a distributed manner to manage the flow and latency or requests made to the supervisory system 754.

The supervisory system 754 may itself be coupled to other devices in a facility via a controller communication network 736 to receive and provide control and status information about the routers 700. Such control and status information may be used to control the routing of data streams within and between routers 700. For example, the other devices in the facility may identify high priority data streams that are to be switched through one or more routers 700 to reach a particular destination. Supervisor system 754 may instruct one or more of the routers to configure an appropriate route between a port on which a high priority data stream is to be received and its destination. In such a situation, a supervisor sub-system 738 may instruct the routers to configure a route directly, without previously having received a request from a controller 732.

FIG. 7 illustrates a control hierarchy in which the supervisory system 754 communicates with other devices, which may be at the same or a different facility as the supervisory system. Supervisors 738 in the supervisor system 754 control the routing of data streams within and between the routers and between the routers and other devices. Controllers 732 in the routers can control routes directly within the router and may request control instructions from supervisors to generate requests. The supervisory system 754 and the controllers 732 are part of a control layer 756 that provides routes for data streams.

FIG. 7 also illustrates a data layer 758 in which the data streams are transmitted. The data layer 758 includes input ports 718, switches 724, backplane connections 752 and output ports 720. The control layer 756 configures the data layer so that data streams are able to traverse the data layer between input ports and output ports.

The present invention has been described here by way of example only. Various modification and variations may be made to these exemplary embodiments without departing from the scope of the invention, which is limited only by the appended claims.

The invention claimed is:

1. A video router comprising:
   a backplane including a plurality of static point-to-point backplane connections;
   a plurality of line cards, each line card including:
      a plurality of input ports and output ports, each input port and output port is coupled to a respective external signal through the backplane;
      a line card cross-point switch having a plurality of input switch terminals and a plurality of output switch terminals such that a first plurality of input and output switch terminals are coupled to the respective plurality of input and output ports and a second plurality of input and output switch terminals are coupled to the plurality of backplane connections;
      a line card controller coupled to the line card cross-point switch to selectively couple some of the input switch terminals to the output switch terminals;
   one or more fabric cards, each fabric card including:
      a fabric card cross-point switch having a plurality of input switch terminals and a plurality of output switch terminals coupled to the plurality of backplane connections;
      a fabric card controller coupled to the fabric card cross-point switch to selectively couple some of the input switch terminals to the output switch terminals; and
   a controller communication network coupled to each of the line cards and fabric cards to control the operation of the fabric card controllers and the line card controllers.

2. The video router of claim 1, further comprising a switch configuration database coupled to the controller communication network and configured to store coupling of at least one of the input switch terminals of the line card cross-point switch and the fabric card cross-point switch to a corresponding output switch terminal.

3. The video router of claim 2, wherein the switch configuration database is stored in the fabric card controllers and the line card controllers.

4. The video router of claim 2, wherein the switch configuration database is stored in an external data storage device and is accessible by the fabric card controllers and the line card controllers.

5. The video router of claim 2, wherein one or more controllers configure one or more corresponding cross-point switches to route a data stream from an input port to an output port, wherein each of the one or more controllers being a fabric card controller or a line card controller, and the corresponding cross-point switches being a corresponding fabric card cross-point switch or a line card cross-point switch.

6. The video router of claim 5, wherein when the data stream is received at the input port, a controller corresponding to at least one of the one or more line cards and the one or more fabric cards processes the data stream and generates an output destination identifying the output port for the data stream.

7. The video router of claim 5, wherein if the data stream is designated a priority stream, at least one of the one or more controllers reconfigures the corresponding cross-point switch to route the priority stream.

8. The video router of claim 1, wherein the backplane comprises a plurality of backplane connectors for receiving the one or more line cards and the one or more fabric cards.

9. The video router of claim 8, wherein each backplane connector comprises a plurality of backplane contacts, wherein each of the one or more line cards and the one or more fabric cards comprises a plurality of card pins, and wherein the plurality of backplane contacts and the plurality of card pins provide an electrical connection when coupled.

10. The video router of claim 8, wherein the backplane further comprises a plurality of point-to-point traces, each point-to-point trace being configured to couple an output switch terminal of a first card to an input switch terminal of a second card, each of the first card and the second card being a line card or a fabric card.

11. The video router of claim 10, wherein the plurality of point-to-point traces are static traces.

12. The video router of claim 5, wherein the data stream comprises data selected from the group consisting of audio data, video data, and a combination of audio and video data.

13. A method of routing video signals from a plurality of input ports to a plurality of output ports using at least one video router of claim 1, the method comprising:
   receiving a data stream at an input port of a first card, the first card being a line card;
   processing the data stream by a first controller of the first card to generate an output destination identifying an output port, the first controller being a line card controller; and
   configuring one or more cross-point switches by corresponding controllers to route the data stream between the input port and the output destination, and wherein at least one of the one or more cross-point switches correspond to a first cross-point switch of the first card.

14. The method of claim 13, further comprising:
   configuring at least one additional cross-point switch other than the first cross-point switch, wherein the one additional cross-point switch is included in a second card coupled to the first card, the second card being a fabric card or a line card.

15. The method of claim 13, further comprising:
   transmitting a routing request to an external device;
   receiving router configuration signal from the external device, the router configuration signal comprising instructions to selectively couple input switch terminals to output switch terminals of the one or more cross-point switches; and
   configuring the one or more cross-point switches based on the router configuration signal.

16. The method of claim 13, wherein each controller corresponding to the one or more cross-point switches comprises a configuration database configured to store coupling instructions between input switch terminals to the output switch terminal of the corresponding cross-point switch.

17. The method of claim 13, wherein each controller corresponding to the one or more cross-point switches is coupled to a configuration database using a controller communication network, wherein the configuration database is configured to store coupling instructions between input switch terminals to the output switch terminal of the corresponding cross-point switch.

18. The method of claim 13, wherein if the data stream is designated a priority stream, the method comprises:
   determining if reconfiguration of the one or more cross-point switches is required to route the priority stream before a second data stream, the second data stream having a lower priority than the priority stream; and
   if reconfiguration is required, reconfiguring the one or more cross-point switches.

19. The method of claim 13, further comprising:
   monitoring one or more performance characteristics of the at least one video router to generate monitored performance data; and
   reconfiguring the one or more cross-point switches based on the monitored performance data.

20. The method of claim 19, wherein at least one performance characteristic comprises frequency of transmission failure of the data stream between an input port and an output port.

* * * * *